United States Patent [19]

Ango

[11] 4,129,035

[45] Dec. 12, 1978

[54] BI-DIRECTIONAL, MULTIPLE RANGE TORQUE MEASURING DEVICE

[76] Inventor: Alvino J. Ango, 1252 Elliott St., Madison Heights, Mich. 48071

[21] Appl. No.: 836,157

[22] Filed: Sep. 23, 1977

[51] Int. Cl.² .............................................. G01L 3/14
[52] U.S. Cl. .................................... 73/136 B; 73/139
[58] Field of Search .............................. 73/136 B, 139

[56] References Cited

U.S. PATENT DOCUMENTS

| 2,051,059 | 8/1936 | Rostron et al. | 73/136 B X |
| 2,400,978 | 5/1946 | Collins | 73/139 |
| 3,052,985 | 9/1962 | Harvey | 73/139 X |

FOREIGN PATENT DOCUMENTS

| 2256516 | 5/1973 | Fed. Rep. of Germany | 73/139 |
| 814483 | 3/1937 | France | 73/136 B |

*Primary Examiner*—Charles A. Ruehl
*Attorney, Agent, or Firm*—Edwin W. Uren

[57] ABSTRACT

A torque measuring device designed for convenient use intermediate a ratchet wrench and socket is provided with a pair of oppositely disposed compression springs that are so housed within the first of a pair of complementary plates as to yield to a rotational force applied in either direction, the compressible yield of one of the springs as the ratchet wrench is turned in a given direction producing a lag in the rotation of the second of the plates which is measured in terms of torque by means of a pointer and a calibrated scale, the convenient substitution of the springs with selected springs of varying tension permitting the wide range of torque measurement including measurement in foot pounds, inch pounds, and metric.

7 Claims, 5 Drawing Figures

BI-DIRECTIONAL, MULTIPLE RANGE TORQUE MEASURING DEVICE

BACKGROUND OF THE INVENTION

Well known torque sensing tools and devices have provided a wide variety of means for either measuring torque or for permitting slippage of a supporting tool when a predetermined torque is exceeded. Included among such means, and most commonly found in the torque measuring art, has been the use of elongated torsion bars or rods for operatively connecting a wrench or the like and a socket or similar workpiece. Since torsion bars for this purpose have been selected according to their particular modulus of elasticity, torque measurement has generally been achieved by variously coupling a pointer or indicator to one extremity of a torsion bar and a calibrated scale to the other extremity thereof, the pointer being displaced from its normal "zero" reading as the torsion bar flexes or twists. Typical of the torque measuring art involving the use of torsion bars or rods are U.S. Pat. Nos. 3,911,736 to Miller, 3,691,826 to Grabovac, 3,481,193 to Schubert and 2,934,946 to Engquist. Although generally suitable for torque measuring per se, these torsion bar devices have generally been of an intricate nature entailing relatively high manufacturing costs, and have further been limited in use to those applications where space limitations have not been critical, as where a ratchet wrench or the like may be operated at a sufficient distance from the socket to accommodate the elongated bar.

Also found in the torque measuring art are various devices making use of torsion or helical springs, such as U.S. Pat. Nos. 2,151,953 to Zimmerman and 2,250,736 to Torresen; and making use of tension springs such as U.S. Pat. No. 1,574,491 to Leake. These torsion springs and tension springs have been characterized by some means of end-anchoring, thereby permitting torque measurement in one direction only.

An additional common characteristic of known torsion bar and spring, and tension spring torque measuring devices is that they are designed for measurement in predetermined set torque ranges only, and lack the flexibility of being readily adaptable to accommodate widely differing ranges of torque.

SUMMARY OF THE INVENTION

It is accordingly an object of the present invention to provide an effective and reliable torque measuring device that is simple in design and economical to manufacture.

It is another object of the present invention to provide a torque measuring device that is compact in size, that may be used in work areas where space is limited, and wherein the ratchet wrench or the like may be operated in close proximity to the socket or workpiece.

It is still another object of the present invention to provide a torque measuring device that may be used for measuring torque applied in either direction, and that may be readily and conveniently adapted for measuring widely differing torque ranges.

An important aspect of the present invention is the provision of a pair of relatively flat complementary circular disks or plates that may be inserted between a ratchet wrench or the like and a socket or the like, a first of the complementary plates housing a pair of arcuately disposed, equally tensioned, loose-ended compression springs that are separated at adjacent ends by a dowel pin forming part of the first plate, and separated at their opposite adjacent ends by a dowel pin forming part of the second of the plates, rotation of the first of the plates in either direction, by means of the ratchet wrench to which it is coupled, serving to activate and to compress the downstream compression spring as the second of the plates is rotated at a slower rate in the same direction, the resulting lag between the rotation of the two plates being measured by a pointer fixed to the second plate and a calibrated scale fixed to the upper surface of the first of the plates.

Another important aspect of the present invention is the provision of simple and convenient means by reason of which a pair of complementary plates may be readily assembled for relative rotation, and readily separated for the convenient substitution of pairs of compression springs of widely differing tension, whereby measurement in widely differing torque ranges may conveniently be accomplished.

BRIEF DESCRIPTION OF THE DRAWINGS

These and other objects, advantages and features of the invention will become more readily apparent from the following detailed description when read in conjunction with the accompanying drawing figures, in which.

DESCRIPTION OF THE PREFERRED EMBODIMENT

The invention resides in the provision of a torque measuring device that is economical to manufacture and effective for use in confined areas and for measuring multiple ranges of torque applied in either direction. The torque measuring device is comprised of a first or upper plate and a second or lower plate which are rotatable relative to one another, the first plate being readily couplable to a ratchet wrench or the like and the second plate being readily couplable to a socket or the like, the first plate effectively housing a pair of arcuately disposed loose-ended compression springs which are separated by and cooperable with a pair of dowel pins, one of the dowel pins being fixed to the first plate and the other to the second plate. The arrangement of the pair of compression springs in an accommodating groove in the lower surface of the first plate is such that rotation of the ratchet wrench in a given direction will result in the compression of the downstream spring and the delayed rotation of the second plate and socket in the same direction.

Figure 1:
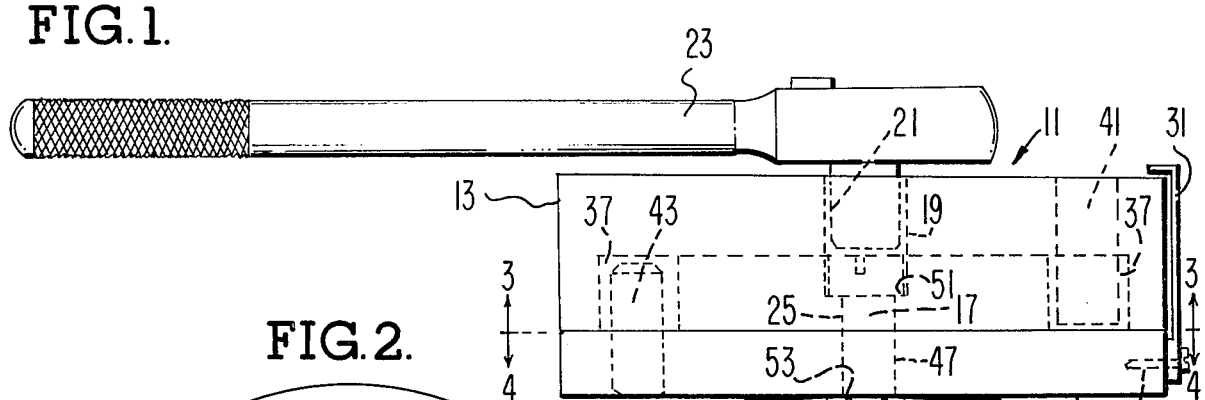
FIG. 1 is an elevational view of the first and second plates of the inventive torque measuring device in coupled relationship with a ratchet wrench and a socket.

With reference to FIG. 1, the inventive torque measuring device generally designated at 11 is comprised of a first or upper circular plate 13 and a second or lower circular plate 15. These pair of circulate plates are coupled together for independent rotation by means of a hereinafter described shoulder screw 17. The first plate 13 is provided with a centrally formed square recess 19 to accommodate the projecting square 21 of a ratchet wrench 23. Also formed in the first plate 13, in coaxial and communicating relationship with the square recess 19 is a first cylindrical recess 25 to accommodate the shoulder screw 17, the particulars of the square recess 19 and first cylindrical recess 25 being described in greater detail hereinafter. The second or lower plate 15 is provided with a centrally formed depending square 27 to accommodate the square recess of a socket 29. The second or lower plate 15 is also provided with an indicator or pointer 31 which is secured to the peripheral surface of the lower plate 15 by means of a screw 33.

Figure 2:
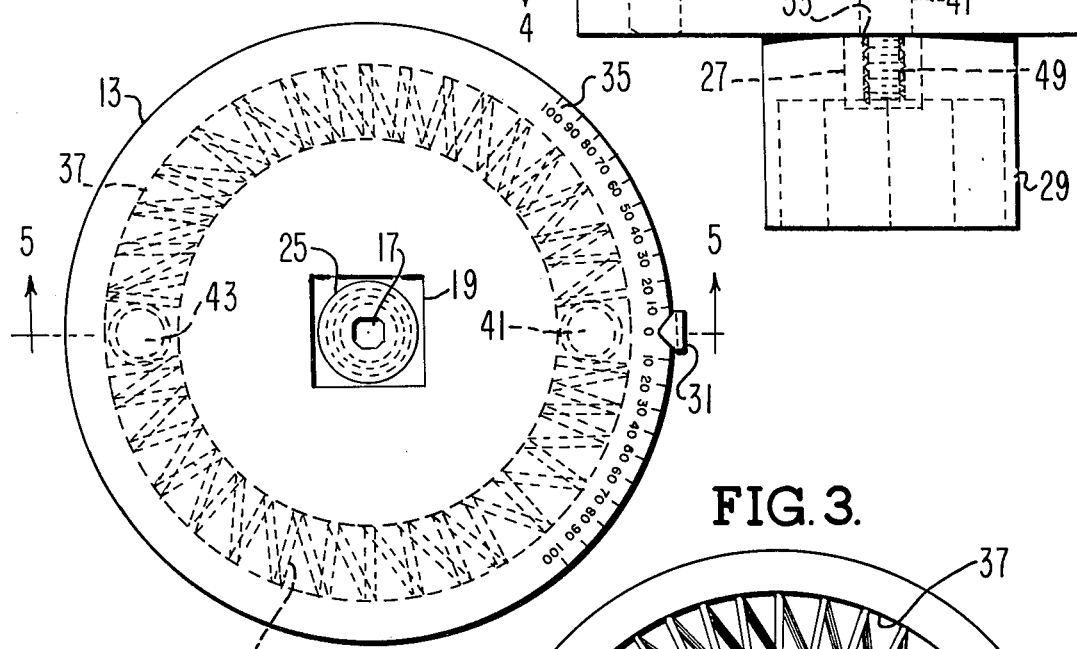
FIG. 2 is a plan view of an upper surface of the first of the plates showing the arrangement of a calibrated scale thereon.
Figure 3:
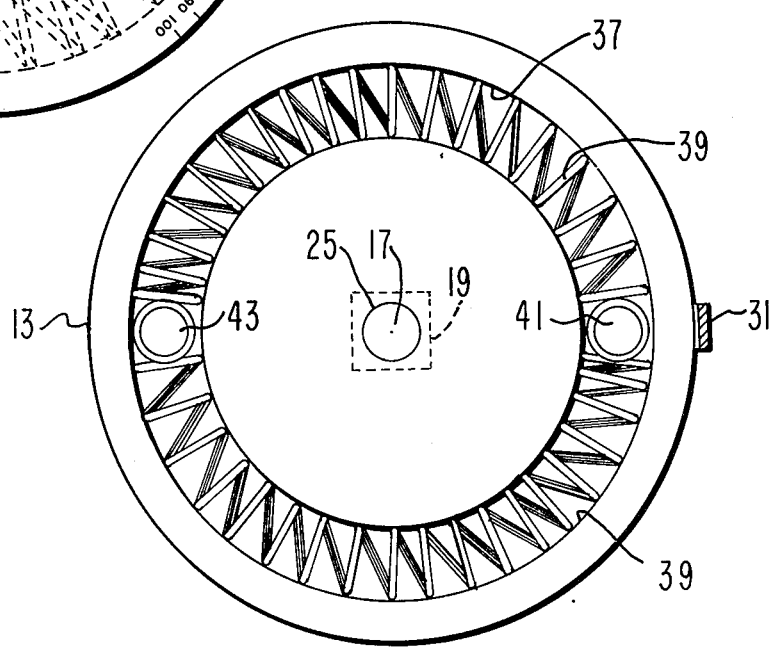
FIG. 3 is a view taken along the line 3—3 of FIG. 1 and showing the underside of the upper plate including the arcuately disposed channel groove for housing the pair of compression springs.

As best shown in FIG. 2, the upper surface of the first plate 13 is provided with a calibrated scale 35 including a central zero marking and identical indicia extending in either direction therefrom, such indicia permitting readable designations of torque applied by the ratchet wrench 23 in either direction. As will be evident infra in connection with the selection of compression springs of differing tension, the calibrated scale 35 may be contained on a replacement plate such that torque readings in widely differing ranges may be provided, such as in terms of inch pounds, foot pounds, or metric. As best illustrated in FIGS. 2 and 3, the first or upper plate 13 is provided with a continuous circular groove or channel 37 formed in the lower surface thereof, such channel or groove serving to house a pair of loose-ended, equally tensioned compression springs 39. The first plate 13 is also provided with a first dowel pin 41 fixed to the upper plate 13 and projecting into the groove or channel 37 to provide separation between the upstream loose ends of the pair of compression springs 39. It is to be noted that the first dowel pin 41 is to be so dimensioned as to clear the upper surface of the second plate 15 as the first plate 13 is rotated in either direction.

Figure 4:
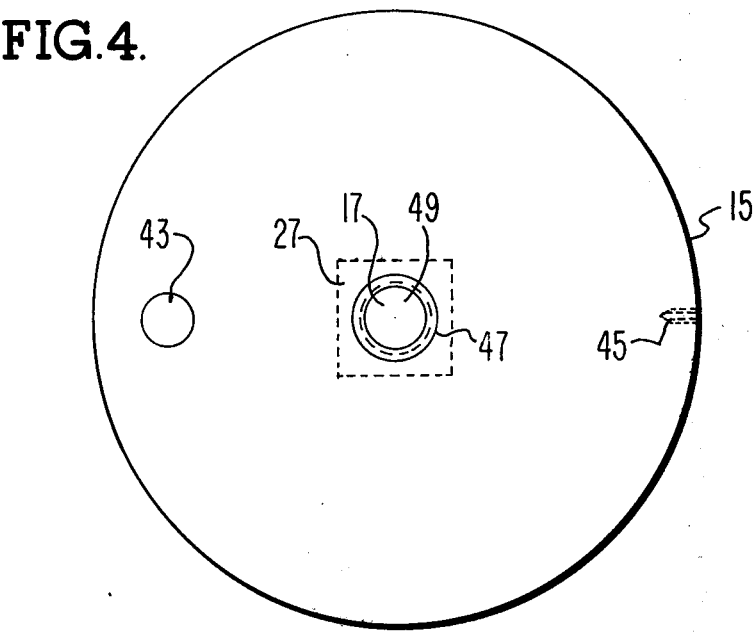
FIG. 4 is a view taken along the line 4—4 of FIG. 1 and showing the upper surface of the lower plate.
Figure 5:
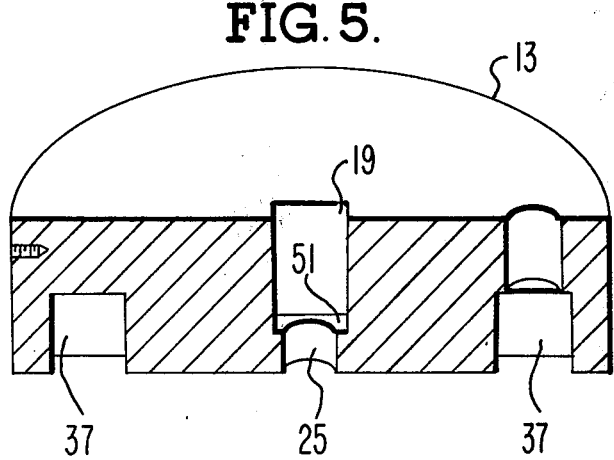
FIG. 5 is a cross sectional view of the first plate taken along the line 5—5 of FIG. 2.

As best illustrated in FIGS. 1 and 4, the second plate 15 is provided with a second dowel pin 43 which is fixed to the upper surface of the plate 15 and extends upwardly into the continuous circular groove 37. It is to be noted that the second dowel pin 43 is to be so dimensioned as to clear both the side walls and upper surface of the groove 37, when the second plate 15 is operably coupled to the first plate 13. The mounting of the previously mentioned indicator or pointer 31, as best shown in FIG. 4, is accomplished by means of a threaded hole 45 into which the previously mentioned screw 33 is secured. As also best shown in FIGS. 1 and 4, the second plate 15 is provided with a centrally formed second cylindrical recess 47 which also serves to accommodate the shoulder shank of the screw 17. The depending square 27 of the second plate 15 is provided with a centrally formed threaded third cylindrical recess 49 into which the threaded end of the shoulder screw 17 is secured, such third cylindrical recess being disposed in communicating relationship with the second cylindrical recess 47.

The mounting of the first and second plates 13 and 15, for independent rotation, is accomplished by the linear dimensioning of the shoulder screw 17, and by a first and second step ledge 51 and 53 best shown in FIG. 1. The first step ledge 51 is formed at the intersection of the square recess 19 and first cylindrical recess 25 formed in the first plate 13, and the second step ledge 53 is formed at the intersection of the second cylindrical recess 47 and threaded third cylindrical recess 49 formed in the second plate 15. The dimensioning of the shoulder shank of the screw 17 is such that with the lower limit of the shoulder abutted securely against the second step ledge 53, the head of the shoulder screw 17 is provided with a slight clearance relative to the first step ledge 51.

The above described mounting of the plates 13 and 15 lends itself to convenient disassembly of the plates, a process requiring the removal of the shoulder screw 17, as by means of a screwdriver inserted into the square recess 19. Upon such convenient disassembly of the plates 13 and 15, pairs of compression springs 39 of differing tension may be inserted conveniently to provide torque measurement in differing ranges, as indicated supra.

Although the inventive torque measuring device has been described in considerable detail, it will be appreciated that various changes therein may be made by those skilled in the art without departing from the true spirit and scope of the invention.

What is claimed is:

1. A torque measuring device suitable for use in conjunction with a ratchet wrench and a socket and effective for measuring torque applied by the wrench in either direction in tightening a nut and bolt associated with a workpiece, said device comprising:
    (a) a pair of complementary circular plates including a first plate couplable to the ratchet wrench and a second plate couplable to the socket, said first plate having a continuous channel groove formed in the lower surface thereof in contiguous relationship to its periphery,
    (b) means for detachably coupling said pair of plates for independent rotation,
    (c) indicator means associated with said pair of plates and effective for readably measuring the degree of their said independent rotation, and
    (d) means for compressibly and variably driving said second plate and said socket upon the application of a rotational force upon said ratchet wrench and said first plate in either direction, whereby the torque applied by said rotational force is designated by said indicator means in response to the rotation of said second plate relative to said first plate, said driving means including a selected pair of arcuately disposed, loose-ended, equally tensioned compression springs operably disposed within said channel groove of said first plate and a pair of dowel pins projectably disposed within said channel groove and separating the loose ends of said pair of compression springs, a first of said dowel pins depending from and being fixed to said first plate and a second of said pins being fixed to and extending upwardly from said second plate, the arrangement being such that upon rotation of the ratchet wrench and first plate in either direction, said first dowel pin depending from said first plate serves to drive said second dowel pin and said second plate by means of the downstream one of said pair of compression springs, said second plate and said socket being driven at a relatively slower rate according to the torque that is applied to said ratchet wrench and the corresponding degree of compression that is applied to said downstream compression spring.

2. The torque measuring device defined in claim 1 wherein said first circular plate is couplable to the depending square of a ratchet wrench by means of a square recess centrally formed in the upper surface thereof, and said second plate is couplable to the square recess of a socket by means of a depending square centrally formed on the lower surface thereof, said square recess of said first plate and said depending square of said second plate providing a slip fit relative to said depending square of said ratchet wrench and said square recess of said socket, respectively.

3. The torque measuring device defined in claim 2 wherein said means for detachably coupling said pair of plates for independent rotation comprises:
   (a) a first cylindrical recess formed in the lower surface of said first plate in coaxial and communicating relationship with said square recess formed in the upper surface thereof, the point of intersection between said square and said first cylindrical recess providing a first step ledge of said coupling means,
   (b) a second cylindrical recess centrally formed in said second plate in coaxial relationship with said depending square,
   (c) a threaded third cylindrical recess centrally formed in said depending square of said second plate and in communicating relationship with said second cylindrical recess, the intersection of said second and said third cylindrical recesses providing a second step ledge of said coupling means, and
   (d) a shoulder screw having a head and an elongated shoulder shank slightly longer than the distance between said first and said second step ledges such that said second plate is free to rotate relative to said first plate when said screw is threadedly secured within said threaded third cylindrical recess of said second plate and the bottom edge of said elongated shoulder shank is abuttably disposed relative to said second step ledge, said freedom of rotation being permitted by a predetermined slight clearance between said screw head and said first step ledge.

4. The torque measuring device defined in claim 1 wherein said indicator means comprises:
   (a) a calibrated scale scribed on the upper surface of said first plate including a zero torque mark and identical readable markings leading in either direction therefrom to designate the degree of torque applied in either direction, and
   (b) a linear indicator fixed to the peripheral surface of said second plate and having an indicating pointer disposed at its upper extremity, said indicating pointer in conjunction with said readable markings on the upper surface of said first plate rendering said markings readable in terms of the degree of torque applied in the rotational activation of said ratchet wrench and said first plate.

5. The torque measuring device defined in claim 1 wherein said first dowel pin fixed to and depending from said first plate is of such predetermined diameter as to clear the side walls of said continuous channel groove and of such predetermined length as to clear the upper surface of said second plate, and said second dowel pin fixed to and extending upwardly from said second plate is of such predetermined diameter as to clear the side walls of said continuous channel groove and of such predetermined length as to clear the upper surface of said channel groove.

6. In a torque measuring tool including a two-piece housing adapted for operable introduction between the depending square of a ratchet wrench or the like and a square recess of a socket or the like, means for detachably coupling a first and second circular plate comprising said two-piece housing for independent rotation thereof, indicator means associated with said circular plates and effective for readably measuring the degree of their said independent rotation, the improvement comprising:
   (a) a continuous channel groove formed in the lower surface of said first circular plate in contiguous relationship with the peripheral surface thereof,
   (b) a selected pair of loose-ended and equally tensioned compression springs disposed within said continuous channel groove, and
   (c) a pair of dowel pins projectably disposed within said channel groove and separating the loose ends of said pair of compression springs, a first of said dowel pins depending from and being fixed to said first plate and a second of said pins being fixed to and extending upwardly from said second plate, the arrangement being such that upon rotation of the ratchet wrench and first plate in either direction, said first dowel pin depending from said first plate serves to drive said second dowel pin and said second plate by means of the downstream one of said pair of compression springs, said second plate and said socket being driven at a slower rate according to the torque that is applied to said ratchet wrench and the corresponding degree of compression that is applied to said downstream compression spring.

7. The torque measuring tool defined in claim 6 wherein said first dowel pin fixed to and depending from said first plate is of such predetermined diameter as to clear the side walls of said continuous channel groove and of such predetermined length as to clear the upper surface of said second plate, and said second dowel pin fixed to and extending upwardly from said second plate is of such predetermined diameter as to clear the side walls of said continuous channel groove and of such predetermined length as to clear the upper surface of said channel groove.

* * * * *